United States Patent [19]

Wilk

[11] 4,018,986
[45] Apr. 19, 1977

[54] CIRCUIT ARRANGEMENT FOR THE TRANSMISSION AND PRESENTATION OF AN ANALOG SIGNAL WITH A VIDEO SIGNAL

[75] Inventor: Klaus Wilk, Kersbach, Germany

[73] Assignee: Siemens Aktiengesellschaft, Berlin & Munich, Germany

[22] Filed: July 29, 1975

[21] Appl. No.: 600,095

[30] Foreign Application Priority Data

July 30, 1974 Germany .................... 2436674

[52] U.S. Cl. ................ 358/142; 178/DIG. 36; 128/2.1 A; 340/212; 358/168

[51] Int. Cl.² .............. H04N 7/02; A61B 5/04; H01R 13/50

[58] Field of Search ....... 178/5.6, DIG. 36, DIG. 6, 178/DIG. 23, DIG. 8, 6.8; 324/121 R; 128/2.1 A; 340/212

[56] References Cited

UNITED STATES PATENTS

| | | | |
|---|---|---|---|
| 3,530,236 | 9/1970 | Marko | 324/121 R |
| 3,578,904 | 5/1971 | Dewey et al. | 178/DIG. 36 |
| 3,742,136 | 6/1973 | Olsson | 178/DIG. 36 |
| 3,798,366 | 3/1974 | Hunt et al. | 178/DIG. 36 |

*Primary Examiner*—John C. Martin
*Attorney, Agent, or Firm*—Hill, Gross, Simpson, Van Santen, Steadman, Chiara & Simpson

[57] ABSTRACT

A circuit arrangement for the transmission and presentation of an analog signal with a video signal, which permits analog signals which incorporate particular measured values or data, to be subverted into a video signal, to be transmitted with the video signal or, for example, stored on a magnetic tape, and then to be removed as analog values. Concurrently, the analog signals should be presented within the video picture so as to be intelligible to the viewer of the television picture screen. For purposes of blending into the video signal (BAS-signal), there is provided a bar or spike impulse transmitter which is synchronized by the synchronizing impulses of the BAS-signal, which generates bar impulses for producing at least one bar of constant brightness on the television picture screen and transmits this to a mixer stage in which the bar impulses are superimposed on the BAS-signal, and wherein a keying or modulating circuit is arranged between the bar impulse transmitter and the mixer stage to which there is transmitted the analog signal and which so modulates the bar impulses in dependence upon the signal so that the length of the bar on the picture screen corresponds to the analog signal.

5 Claims, 19 Drawing Figures

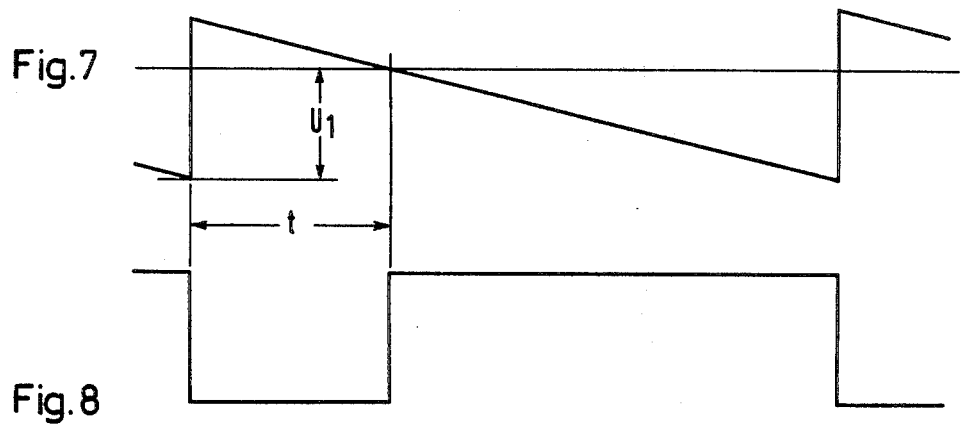
Fig. 6
Fig. 7
Fig. 8
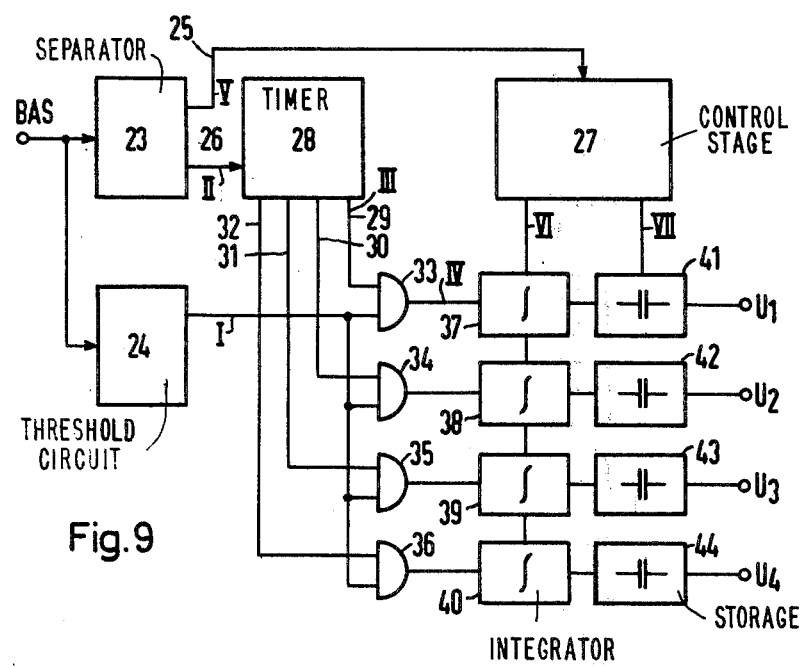
Fig. 9

CIRCUIT ARRANGEMENT FOR THE TRANSMISSION AND PRESENTATION OF AN ANALOG SIGNAL WITH A VIDEO SIGNAL

FIELD OF THE INVENTION The present invention relates to a circuit arrangement for the transmission and presentation of an analog signal with a television or video signal.

DISCUSSION OF THE PRIOR ART

A circuit arrangement has been previously described which permits an EKG signal and the beat frequency of the heart to be reproduced on the picture screen of a cathode-ray tube or oscilloscope. Hereby, the EKG signal is produced, in a known manner, through horizontal and vertical deflections of the cathode-ray, whereas the heart beat frequency is reproduced by means of a raster or grid of horizontal lines in which the length of the bright portions along the horizontal direction are adjusted pursuant to the currently average height or magnitude of the beat frequency. An analogous magnitude, namely the beat frequency of the heart, is thus represented in this circuit arrangement by means of two different types, namely, as a curve plot and as horizontal bars or spikes whose lengths depend upon the analog signal. The known circuit arrangement does not permit a picture to be reproduced in a video mode, in essence through linewise cathode-ray movement, and to then transmit and present an analog signal by means of the video or television signal.

SUMMARY OF THE INVENTION

Accordingly, it is an object of the present invention to provide a circuit arrangement for the transmission and presentation of an analog signals which incorporate particular measured values or data, to be subverted into a video signal, to be transmitted with the video signal or, for example, stored on a magnetic tape, and then to be recovered as analog values. Concurrently, the analog signals should be presented within the video picture so as to be intelligible to the viewer of the television picture screen.

The foregoing object is inventively achieved in that, for purposes of blending into the video signal (BAS-signal), there is provided a bar or spike impulse transmitter which is synchronized by the synchronizing impulses of the BAS-signal, which generates bar impulses for producing at least one bar of constant brightness on the television picture screen and transmits this to a mixer stage in which the bar impulses are superimposed on the BAS-signal, and wherein a keying or modulating circuit is arranged between the bar impulse transmitter and the mixer stage to which there is transmitted the analog signal and which so modulates the bar impulses on dependence upon the signal so that the length of the bar on the picture screen corresponds to the analog signal.

The analog signals are preferably represented in a form of vertical columns which are somewhat similar to the so-called columnar graphic or diagrammatic plots, meaning they are blended into a presently existent video picture. The particular advantage of the arrangement according to the invention consists of in that analog signals which are obtained concurrently with the video picture obtained analog signals may, for example after storage, be immediately timely correlated with the video picture. The measured values are thus produced with the video picture and may be concurrently recovered as electrical magnitudes. Thereby, the circuit arrangement is extremely simple in its construction inasmuch as the bar is tapped off from the synchronizing impulses of the picture, scanning and synchronizing signal (BAS-signal).

Within the scope of the invention it is also possible to concurrently reproduce a plurality of analog signals, namely for instance a number of measured values in the form of mutually parallel and preferably vertically extending bars or spikes in a video picture. Hereby, the length of each bar corresponds to the therewith associated analog signal.

Within the scope of the invention it is also possible that when the BAS-signal contains a plurality of analog signals in the form of bar or spike impulses, all of these analog signals may be again recovered.

BRIEF DESCRIPTION OF THE DRAWINGS

Further advantages and details of the invention may now be ascertained from the following description of exemplary embodiments thereof, taken in conjunction with the accompanying drawings; in which:

FIGS. 2 through 8 respectively illustrate the timewise signal sequence at various locations of the circuit arrangement according to FIG. 1;

FIG. 9 illustrates a circuit arrangement for the recovery of the analog signal from the BAS-signal which, pursuant to the circuit arrangement of FIG. 1, has bar impulses superimposed thereon.

DETAILED DESCRIPTION

The illustrated exemplary embodiment facilitates that four analog signals in the form of four bars or spikes may be represented on the picture screen of a television picture tube concurrently with a video picture, and that the analog signals may be again recovered from the BAS-signal.

Figure 1:
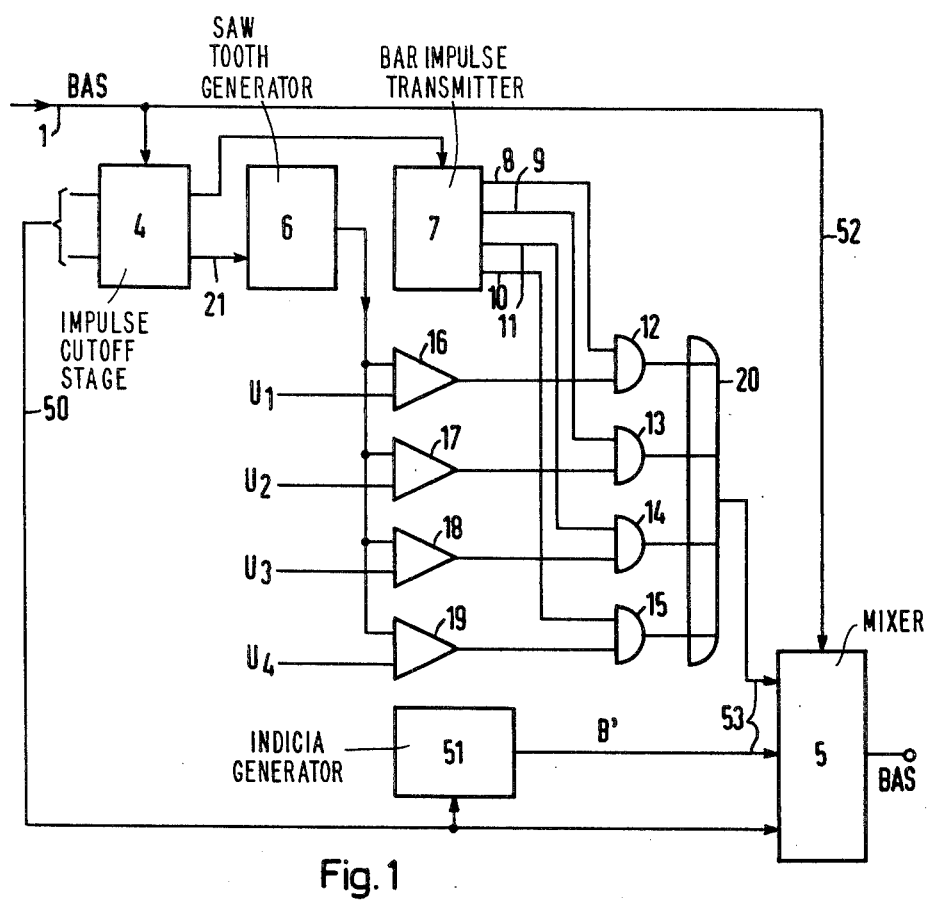
FIG. 1 schematically illustrates a circuit arrangement for the reproduction of an analog signal constructed pursuant to the invention.
Figure 2:
Figure 3:
Figure 4:
Figure 5:

Referring to FIG. 1 of the drawing, the BAS-signal (picture-, scanning- and synchronizing signal) for a video picture, for example, an X-ray or ultrasonic image, is transmitted through an electrical conduit 1 to an impulse cutoff stage 4. This stage cuts off the synchronizing impulses. The impulse cut off stage 4 transmits the vertical impulses to a saw-tooth generator 6 and the horizontal impulses to a bar impulse transmitter 7. The bar impulse transmitter 7 possesses four outputs 8 through 11 and produces a bar or spike impulse at each of its outputs between two horizontal impulses, which is small in comparison with the timewise spacing between the two horizontal impulses. All of the bar impulses at one output of the bar impulse transmitter 7 lie at the same location between two horizontal impulses and are associated with a vertically located bar on the picture screen of the television picture tube. However, the bar impulses at output 9 are displaced in time with respect to the bar impulses at output 8. Similarly, the bar impulses at output 10 are displaced in time with respect to the bar impulses at output 9, and the bar impulses at output 11 are displaced in time with respect to the bar impulses at output 10.

The bar impulses are transmitted to four AND-gates 12 through 15, whose second inputs lead to four comparators 16 through 19. The comparators 16 through 19 compare the output voltage of the saw-tooth generator 6 with four input voltages U1 through U4, which embody four analog signals to be reproduced in the form of bars, for example, four measured values. These measured values, for example, may be the pulse frequency, the breathing frequency, the blood pressure or other physiological measured values of a patient.

The saw-tooth generator 6 is activated with each vertical impulse and delivers a saw-tooth impulse whose duration is approximately equal to the time interval between two vertical impulses.

The output impulses of the AND-gates 12 thrugh 15 are superimposed on a picture signal through the intermediary of an OR-gate 20, which is produced in an indicia generator 51. This picture signal, for example, may contain alpha-numerical indicia or auxiliary lines, for instance, for maximum and minimum indication. The indicia generator receives synchronizing impulses from the impulse cut off stage 4 through the conduit or line 50.

When the output impulses at the outputs 8 through 11 of the bar impulse transmitter 7 are superimposed directly on the BAS-signal, then four vertical parallel stripes are reproduced on the picture screen of the television picture tube, which extend over the entire picture height. The length of each stripe must now be correlated to the current analog signal. For this purpose, the AND-gates 12 through 15 are opened when the output voltage of the saw-tooth generator 6 reaches the current analog signal. At different analog signals there thus is effected an opening of the AND-gates 12 through 15 at different time points during the presentation of a video picture, so that different quantities of bar impulses are superimposed on the BAS-signal. It is thereby ascertained that the length of each of the four bars is dependent upon the associated analog input signal U1 through U4.

FIGS. 2 through 5 illustrates the signal sequence or conditions at the outputs 8 through 11 of the bar impulse transmitter. Illustrated in chain-dotted lines are the horizontal synchronizing impulses. From FIGS. 2 through 5 it becomes clearly evident that a bar impulse is delivered between two horizontal synchronizing impulses at each output, and that the bar impulses at the output 8 through 11 are displaced in time with respect to each other whereby there are reproduced four parallel vertical bars.

FIG. 6 illustrates the vertical impulses in the conduit or line 21, and FIG. 7 shows the time cycle or sequence of the saw-tooth impulse at output 22 as well as an input voltage, and namely the input voltage U1. From FIG. 7 there may be ascertained that the comparator 16 during the time period $t$, within which the saw-tooth impulse is higher than the voltage U1, delivers an output impulse which is shown in FIG. 8 and that, in effect, the AND-gate is thus open during the time period $t$ and permits passage of a corresponding number of bar impulses which are delivered at the output 8.

In the mixer stage 5 there is mixed the original BAS-signal from line 1, which lies at input 52, with the synthetic B'-signal mixture at input 43. In the illustrated example, the BAS-signal at input 52 is scanned through the synthetic B'-signal at input 53, and namely in a manner in which the synthetic signal appears as white. At the outputs of the mixing stage 5 there accordingly occurs a BAS-signal which, in addition to the synchronizing and scanning impulses as the picture content of the picture corresponding to the BAS-signal in the line 1, for example, X-ray or ultrasonic picture, contains four vertical bars whose lengths correspond to four measured values, an additional indicia such as, for instance, reference lines or numerals.

The circuit arrangement according to FIG. 9 facilitates that the BAS-signal with the superimposed bar impulses may be so processed that the four analog signal U1 through U4 are again recovered. The BAS-signal is transmitted in parallel to an impulse separating element 23 and a threshold element 24. The impulse separating element 23 delivers the vertical impulses to the conduit 25 and the horizontal impulses to the conduit 26. The vertical impulses are transmitted to a control stage 27 and the horizontal impulses to a timer 28. The timer 28 possesses four outputs in correspondence with the outputs 8 through 11 of the bar impulse transmitter 7, which are designated by reference numerals 29 through 32. At the output 29 the timer delivers a timing impulse which coincide with the bar impulses at output 8, at output 30 time impulses which coincide with the bar impulses at output 9, and so forth. The output impulses of the timer 28 are transmitted to four AND-gates 33 through 36, whose output signals are integrated in four integrators 37 through 40. Storages 41 through 44 are connected to the outputs of integrators 37 through 40. The AND-gates 33 through 36 are commonly connected to the output of the threshold element 24.

Figure 10:
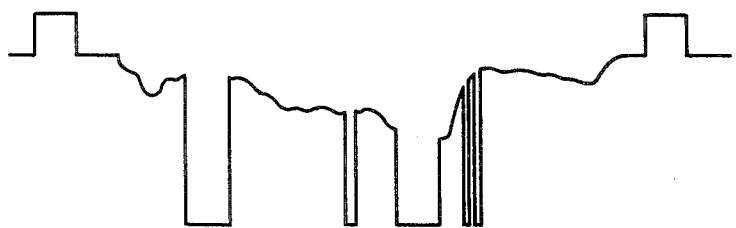
FIGS. 10 through 19 respectively illustrate the timewise signal sequence at various locations of the circuit arrangement of FIG. 9.
Figure 11:
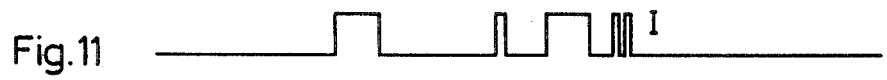
Figure 12:
Figure 13:
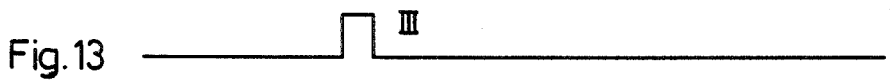
Figure 14:
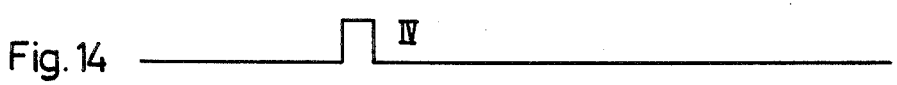
Figure 15:
Figure 16:

For example, FIG. 10 illustrates the cycle or sequence of the BAS-signal between two horizontal impulses. The BAS-signal, in this example, contains only two impulses from four possible bar impulses and exceeds the threshold of the threshold element 24 with the bar impulses and with three further impulses which embody the picture signal. Accordingly, at the output I of the threshold element the voltage proceeds in conformance with FIG. 11. At the output II of the impulse separating element 23 there are present horizontal impulses pursuant to FIG. 12. FIG. 13 illustrates the output impulses at the location III in FIG. 9, meaning at the output 29 of the timer 28. These output impulses coincide with the presently initial bar impulses of the BAS-signal, so that only these initial bar impulses (FIG. 14) appear at the output IV of the AND-gate 33. In summation, it may thus be determined that the output impulses of the AND-gates 33 through 36 correspond to the output impulses of the AND-gates 12 through 15 in FIG. 1. These output impulses are integrated in the integrators 37 through 40, for each video picture. The voltage at output V of the impulse separating element 23 proceeds in conformance with FIG. 15. FIG. 15 thus illustrates the timewise sequence of the vertical impulses. Between two vertical impulses there are now located for each measured value, meaning for each analog signal, a number of bar impulses pursuant to FIG. 16 whose quantity corresponds to the magnitude of the analog signal. FIG. 16 is predicated on that the analog signal varies, in effect, that the stripes which are reproduced on the picture screen of the television tube vary from the video picture to video picture and, namely, are shortened.

Figure 17:
Figure 18:

The voltage at output VI of the control stage 27 proceeds pursuant to FIG. 17, and the voltage at output VII pursuant to FIG. 18. The voltage according to FIG. 17 effects the extinguishing of the integrators 37 through 40. After a vertical impulse, there thus increases the voltage at integrator 37, for which the illustrated curves are valid, and pursuant to FIG. 19 in step-shape up to a maximum value, with the integrator being again extinguished at the beginning of the next output impulse at output VI. Prior to extinguishing, however, through an impulse pursuant to FIG. 18 there is effected a storage input into the storage 41. After the extinguishing, the integrator 37 is once again ready for the integration of the output impulses of the subsequent video picture, pursuant to FIG. 19. These three output impulses lead to an analog voltage which is lower than the previous analog voltage and which, through an impulse pursuant to FIG. 18, is similarly transmitted into the storage 41.

Figure 19:
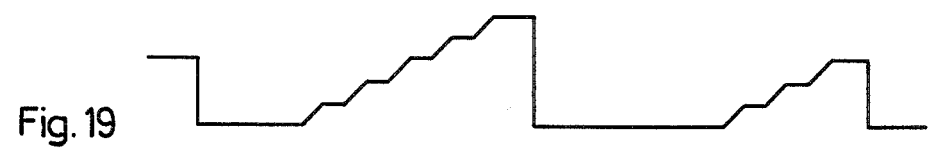

The operative effect of FIG. 19 is described in connection with FIGS. 10 through 19 for only one channel, and namely for the analog signal U1 which can be retrieved at the output of the storage 41. The operation for effecting recovery of the other analog signals from the BAS-signal which is superimposed with bar impulses, is carried out in the same manner.

While there has been shown what is considered to be the preferred embodiment of the invention, it will be obvious that modifications may be made which come within the scope of the disclosure of the specification.

What is claimed is:

1. A circuit for the transmission and presentation of an analog signal with a video signal on the video picture screen of a television picture tube, comprising a bar impulse transmitter synchronized by synchronizing impulses from said video signal, said bar impulse transmitter generating bar impulses for producing at least one bar of constant brightness on said video picture screen; a mixer stage for receiving said bar impulses from said bar impulse transmitter, said bar impulses being superimposed on said video signal in said mixer stage; modulating circuit means being connected intermediate said bar impulse transmitter and said mixer stage for receiving said analog signal and modulating said bar impulses dependent thereon whereby the length of the bar on said picture screen corresponds to said analog signal; al least one integrator for integrating the bar impulse superimposed on said video signal for each video picture.

2. A circuit arrangement as claimed in claim 1, comprising a storage being connected to the output of said integrator; and control means for transmitting the contents of said integrator into said storage and extinguishing said integrator upon the reproduction of a video picture.

3. A circuit arrangement as claimed in claim 1, comprising an integrator for respectively each said bar.

4. A circuit arrangement for the transmission and presentation of an analog signal with a video signal on the video picture screen of a television picture tube, comprising a bar impulse transmitter syncnronized by synchronizing impulses from said video signal, said bar impulse transmitter generating bar impulses for producing at least one bar of constant brightness on said video picture screen; a mixer stage for receiving said bar impulses from said bar impulse transmitter, said bar impulses being superimposed on said video signal in said mixer stage; modulating circuit means being connected intermediate said bar impulse transmitter and said mixer stage for receiving said analog signal and modulating said bar impulses dependent thereon whereby the length of the bar on said picture screen corresponds to said analog signal; means for producing a plurality of horizontal synchronizing impulses, said bar impulse generator producing a bar impulse after each said horizontal synchronizing impulse after a time period equal for all picture lines which is smaller than the time between two of said horizontal synchronizing impulses, said bar impulse being smaller in comparison with the time interval between two successive of said horizontal synchronizing impulses, said modulating circuit means superimposing a plurality of said bar impulses on said video signal corresponding to the analog signal to be reproduced for each video picture; a timer adapted for synchronizing impulses, said timer emitting a time pulse after each horizontal impulse coinciding with the subsequent bar impulses; a threshold stage receiving said video signal with the superimposed bar impulses for separation of said video signal; an AND-gate having an input connected with the outputs of said timer and threshold stage; and an integrator for integrating the output signal of said AND-gate.

5. A circuit arrangement as claimed in claim 4, said timer including an output for respectively each said bar at which the timer generates time impulses coinciding with associated bar impulses; a plurality of said AND-gates; each timer output being connected to a first input of respectively one of said AND-gates, the output signal of said threshold stage being transmitted to second inputs of all of said AND-gates; a plurality of said integrators, the output signal of respectively each of said AND-gates being transmitted to respectively each of said integrators.

* * * * *